United States Patent
Preis

[19]

[11] Patent Number: 6,087,793
[45] Date of Patent: Jul. 11, 2000

[54] CIRCUIT FOR CONTROLLING A MOTOR WITH A DEVICE FOR RECOGNIZING AN OVERLOAD

[75] Inventor: Karl-Heinrich Preis, Buehlertal, Germany

[73] Assignee: Robert Bosch GmbH, Stuttgart, Germany

[21] Appl. No.: 09/269,603

[22] PCT Filed: Jul. 7, 1998

[86] PCT No.: PCT/DE98/01868

§ 371 Date: Jun. 9, 1999

§ 102(e) Date: Jun. 9, 1999

[87] PCT Pub. No.: WO99/05762

PCT Pub. Date: Feb. 4, 1999

[30] Foreign Application Priority Data

Jul. 25, 1997 [DE] Germany ............................ 197 32 095

[51] Int. Cl.[7] .................................................. H02H 7/08
[52] U.S. Cl. ......................... 318/434; 318/439; 318/430; 318/493
[58] Field of Search .................................. 318/434, 138, 318/139, 245, 254, 280–293, 430–494; 361/91, 33

[56] References Cited

U.S. PATENT DOCUMENTS

| | | | |
|---|---|---|---|
| 3,629,608 | 12/1971 | Trindle | 307/140 |
| 3,633,073 | 1/1972 | Day | 317/38 |
| 4,910,445 | 3/1990 | Borrmann | 318/468 |
| 4,980,624 | 12/1990 | Bernhardt | 318/434 |
| 5,453,669 | 9/1995 | Nishibe et al. | 318/434 |
| 5,719,732 | 2/1998 | Nagahama et al. | 361/29 |

FOREIGN PATENT DOCUMENTS

| | | |
|---|---|---|
| 0 536 488 | 4/1993 | European Pat. Off. . |
| 195 02 216 | 7/1996 | Germany . |
| 92 20891 | 11/1992 | WIPO . |

OTHER PUBLICATIONS

Patent Abstracts of Japan—vol. 015, No. 014 (E–1022), Jan. 11, 1991; JP 02 262 897 Copy of article has been provided by the International Searching Authority.

*Primary Examiner*—Paul Ip
*Attorney, Agent, or Firm*—Kenyon & Kenyon

[57] ABSTRACT

A circuit arrangement for cycled control of a motor, includes an overload detection device which has a signal sensing stage. Reliable detection of a motor overload is achieved, substantially without losses in the electronic system and with an economical configuration, by the fact that the overload of the motor can be sensed by way of the signal sensing stage by picking off a voltage peak which occurs at a circuit inductance.

6 Claims, 2 Drawing Sheets

CIRCUIT FOR CONTROLLING A MOTOR WITH A DEVICE FOR RECOGNIZING AN OVERLOAD

FIELD OF THE INVENTION

The present invention refers to a circuit arrangement for cycled control of a motor, having an overload detection device.

BACKGROUND INFORMATION

A conventional circuit arrangement of this kind provides a shunt for sensing a motor overload such as can occur, for example, in an engine cooling motor or a fan motor as the vehicle drives through water. The elevated engine current due to the overload generates at the shunt an elevated voltage drop which is sensed for overload detection purposes. The shunt itself generates a not inconsiderable power dissipation, and is also not inconsiderable in terms of cost.

SUMMARY OF THE INVENTION

It is the object of the present invention to make available a circuit arrangement which reliably senses a motor overload and is advantageous in terms of energy consumption and cost.

The overload detection device includes a signal sensing stage with which a voltage peak which occurs at a circuit inductance, and in the event of a motor overload exceeds a predefined threshold voltage, can be sensed. Sensing of the voltage peak occurring at the circuit inductance not only results in reliable signal detection, but the signal is also generated with minimal power dissipation. The voltage peak depends on the motor current, so that the overload can be reliably detected by comparison with the predefined threshold voltage. The circuit inductance can be picked off at a suitable line, in particular on a circuit board.

A favorable pickoff possibility for the voltage peak is offered by the fact that the circuit inductance is constituted by a line inductance in a connecting line of an electrolytic capacitor connected in parallel with the motor.

Signal sensing can be accomplished with simple means by the fact that the circuit inductance is formed at the connecting line to the negative terminal of the electrolytic capacitor, and that the signal sensing stage has, in order to decouple a positive voltage peak, a diode which is connected with its anode to the negative terminal of the electrolytic capacitor and whose cathode is connected to ground via a capacitor and a resistor connected in parallel with the latter.

Simple, reliable sensing of the motor overload is promoted by the fact that the voltage peak is conveyed to one terminal of a comparator stage, at whose other terminal the threshold voltage is formed.

It is advantageous for economical manufacture in terms of components and production that the signal sensing stage is embodied at least partially using SMD technology.

DETAILED DESCRIPTION

Figure 1:
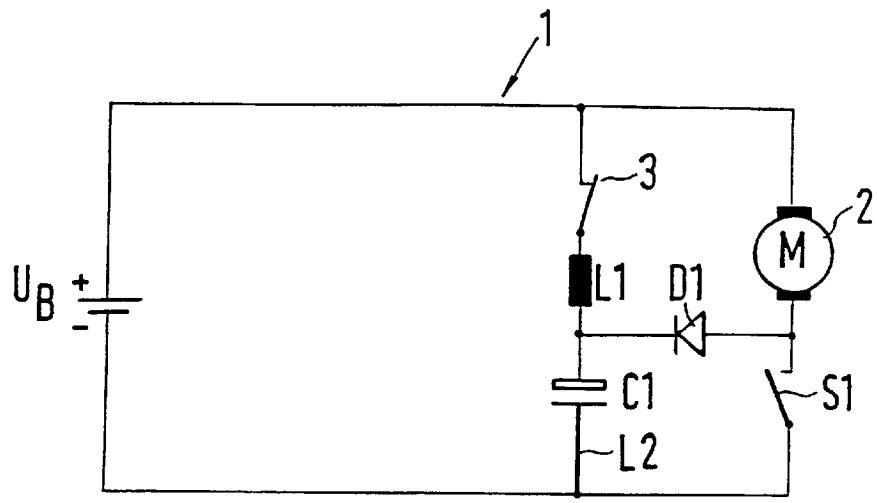
FIG. 1 shows an exemplary embodiment of a circuit arrangement for a motor control system according to the present invention.

FIG. 1 shows a circuit arrangement 1 having a motor 2 that is controlled in a cycled manner via an electronic switch S1, preferably in the form of a power MOSFET. Located parallel to the motor 2 is a circuit branch having an electrolytic capacitor C1 as well as a noise-suppression inductor L1 and a mispolarity protector with a further electronic switch 3. Connected between the negative terminal of motor 2 and the positive terminal of electrolytic capacitor C1 is a freewheeling diode D1, with its anode at the motor terminal and its cathode at the positive terminal of electrolytic capacitor C1. A line inductance L2 is located between the negative terminal of electrolytic capacitor C1 and the ground terminal. Circuit arrangement 1 is powered by a battery voltage $U_B$.

Figure 2:
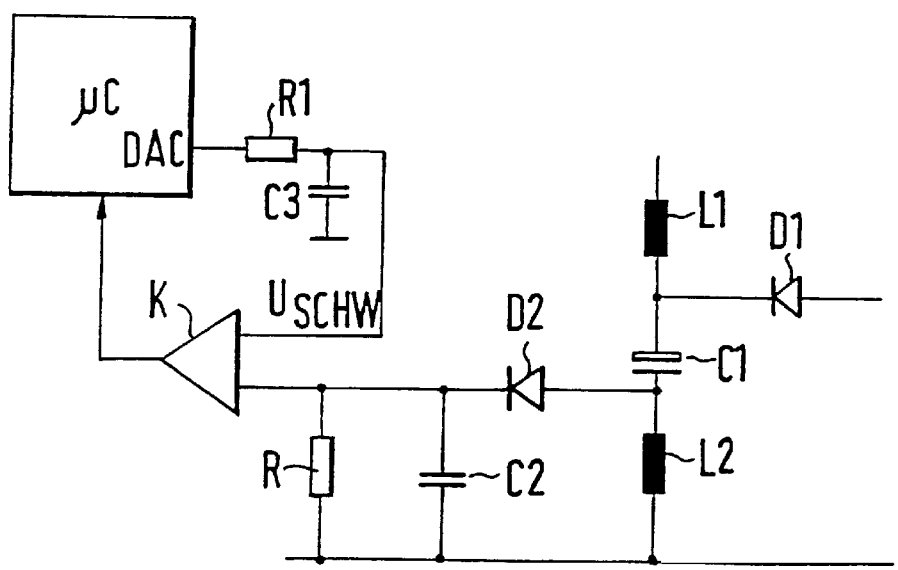
FIG. 2 shows a portion of the circuit arrangement shown in FIG. 1, depicting a signal sensing stage.
Figure 3:
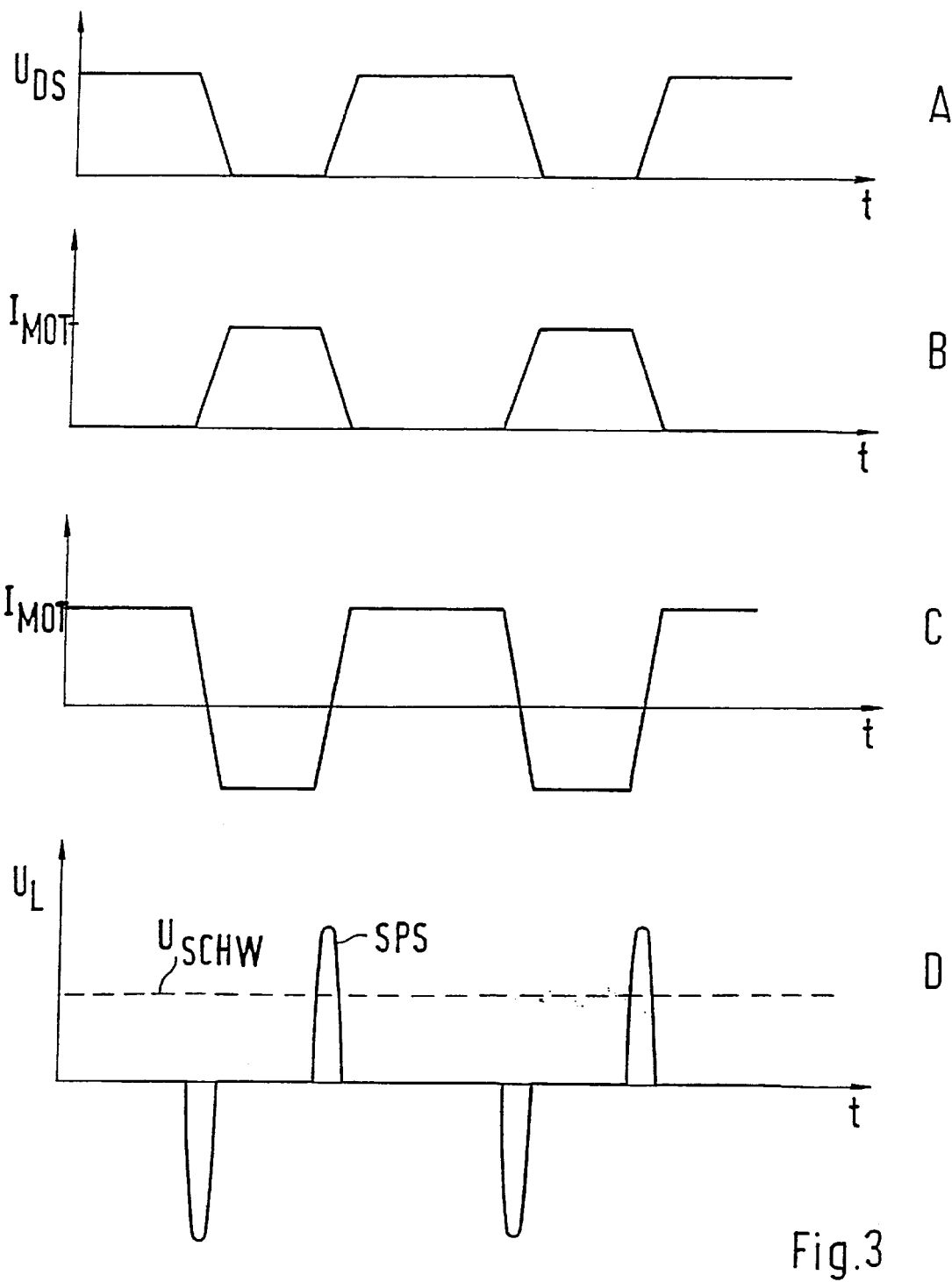
FIG. 3 shows signal profiles of the circuit arrangement depicted in FIGS. 1 and 2.

As depicted, for example, in FIG. 2, a signal detection stage of an overload detection device is connected to line inductance L2. The signal detection stage has a diode D2 which is connected with its anode to the negative terminal of electrolytic capacitor C1 and with its cathode to a parallel circuit made up of a capacitor C2 and a discharge resistor R, whose other terminals are connected to ground. The signal detection circuit causes positive voltage peaks SPS as shown in FIG. 3, which occur at the circuit inductance (in the form of line inductance L2) as motor 2 is cycled, to be decoupled and sensed by a comparator stage K, which is connected to the signal detection stage and compares voltage peaks SPS to a threshold voltage $U_{SCHW}$. Voltage peaks SPS are analyzed in order to detect a motor overload.

Various other signal detection stages are also possible; a temperature compensator for a diode can also be provided.

Signal detection is accomplished with a microcomputer μC which defines, via a digital/analog converter DAC, the allowable maximum current and the threshold voltage $U_{SCHW}$, so that an overload can be detected even at low currents (engine speeds). A motor startup peak can also be blanked out. A switching element, having a resistor R1 and a capacitor C3 connected to ground, is located between the digital/analog output of microcomputer μC and the one input of comparator K. Other analysis circuits are also possible instead of this circuit element.

FIG. 3 shows, in a diagram, a variety of signal profiles for circuit arrangement 1. Part A of FIG. 3 reproduces drain-source voltage $U_{DS}$ of power MOSFET S1 over time t. Part B of FIG. 3 shows the motor current in the branch of power MOSFET S1, while part C of FIG. 3 shows the motor current in the branch of circuit arrangement 1 leading to electrolytic capacitor C1. Part D of FIG. 3 depicts voltage peaks SPS, already mentioned, of voltage $U_L$ occurring at line inductance L2. As drain-source voltage $U_{DS}$ changes from H level to L level, engine current $I_{MOT}$ flowing in the circuit branch to electrolytic capacitor C1 causes a negative voltage peak SPS at line inductance L2, while as drain-source voltage $U_{DS}$ changes from L level to H level, motor current $I_{MOT}$ flowing to electrolytic capacitor C1 results in a positive voltage peak SPS. In the event of motor overload, voltage peaks SPS considerably exceed threshold voltage $U_{SCHW}$, so that these voltage peaks SPS guarantee reliable overload detection.

The switching times between the H level and L level of the drain-source voltage and motor currents $I_{MOT}$ are substantially constant. Temperature effects are taken into account in dimensioning. A signal height of voltage peaks SPS that has resulted for a fan motor is, for example, 1 V/20 A. If the motor becomes immobilized, for example as the vehicle travels through water, a higher motor current $I_{MOT}$ flows during the energized period, although the average lead current from the battery is low. The immobilization can thus be detected even before the maximum allowable operating current is exceeded.

The signal detection stage can be embodied economically by embodying, in particular, diode D2 and capacitor C2 using SMD technology. The overload detection device does not cause any additional electronic losses by sensing voltage peaks SPS at line inductance L2.

What is claimed is:

1. A circuit arrangement for a cycled control of a motor, comprising:
   a circuit inductance;
   an overload detection device including a signal sensing stage, the signal sensing stage sensing an overload of the motor by picking off a voltage peak which occurs at the circuit inductance; and
   an electrolytic capacitor connected to the motor, wherein the circuit inductance is formed, in a connecting line of the electrolytic capacitor, by a line inductance.

2. The circuit arrangement according to claim 1, wherein the connecting line is connected to a negative terminal of the electrolytic capacitor.

3. The circuit arrangement according to claim 1, further comprising:
   a comparator stage including a first terminal and a second terminal, the voltage peak being provided to the first terminal, a threshold voltage being formed at the second terminal.

4. The circuit arrangement according to claim 2, wherein the signal sensing stage includes a diode, a capacitor and a resistor, the diode including an anode and a cathode and decoupling a positive voltage peak, the anode being coupled to the negative terminal of the electrolytic capacitor, the cathode being coupled to a ground via the capacitor and the resistor, the capacitor being coupled in parallel to the resistor.

5. The circuit arrangement according to claim 1, wherein the signal sensing stage is at least partially embodied using a SMD technology.

6. A circuit arrangement for a cycled control of a motor, comprising:
   a circuit inductance;
   an overload detection device including a signal sensing stage, the signal sensing stage sensing an overload of the motor by picking off a voltage peak which occurs at the circuit inductance; and
   a comparator stage including a first terminal and a second terminal, the voltage peak being provided to the first terminal, a threshold voltage being formed at the second terminal, wherein the overload detection device includes a microcomputer and a digital/analog converter, the microcomputer analyzing the voltage peak, and wherein an allowable maximum current for the comparator stage is defined at an output of the microcomputer via the digital/analog converter.

* * * * *